L. F. KERNDL.
COMBINED TIRE VALVE AND PRESSURE GOVERNOR.
APPLICATION FILED FEB. 9, 1916.
1,267,231.
Patented May 21, 1918.
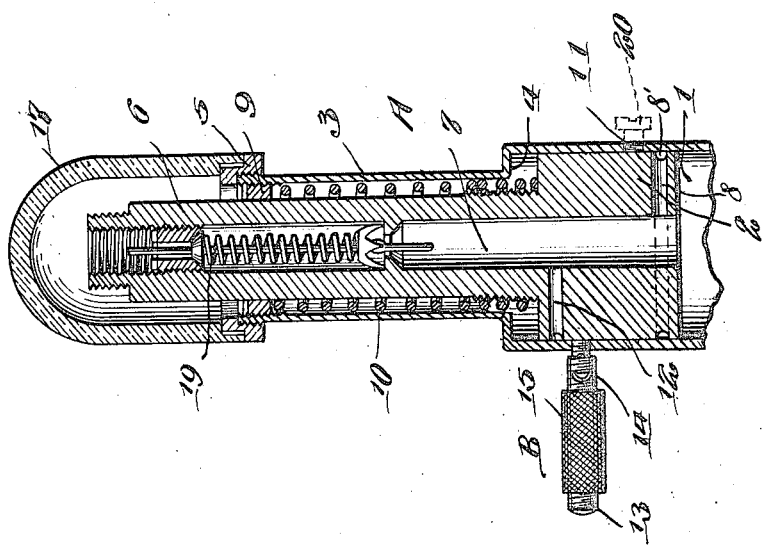
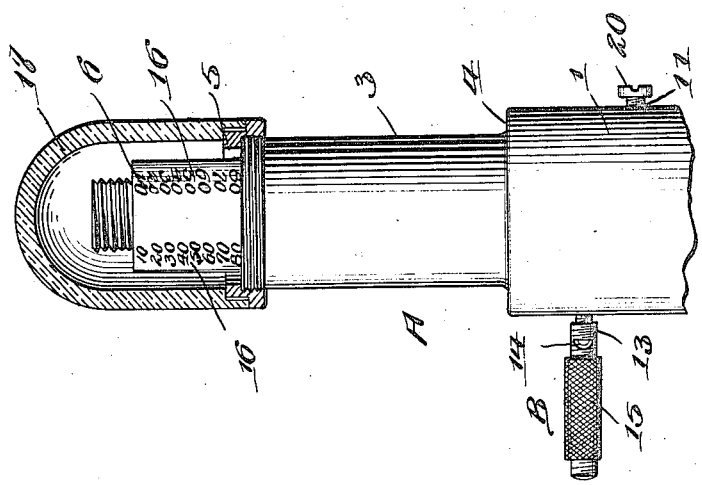
Inventor
Louis F. Kerndl.
Witnesses
Frederick L. Fry.
P. M. Smith.
By Victor J. Evans.
Attorney

UNITED STATES PATENT OFFICE.

LOUIS F. KERNDL, OF LANSING, MICHIGAN.

COMBINED TIRE-VALVE AND PRESSURE-GOVERNOR.

1,267,231.  Specification of Letters Patent.  Patented May 21, 1918.

Application filed February 9, 1916. Serial No. 77,321.

*To all whom it may concern:*

Be it known that I, LOUIS F. KERNDL, a citizen of the United States, residing at Lansing, in the county of Ingham and State of Michigan, have invented new and useful Improvements in Combined Tire-Valves and Pressure-Governors, of which the following is a specification.

This invention relates to valves especially designed for use in connection with pneumatic tires, the object in view being to provide in one article, applicable to pneumatic tires, a tire inflating valve, a pressure indicator, a high pressure governor, and a low pressure indicator, the valve embodying a simple and novel construction and relative arrangement of parts whereby the valve as a whole may be set to automatically relieve excess pressure over a predetermined number of pounds per square inch, also to indicate when a predetermined low pressure is reached, and also to provide for the inflation of the tire to the proper pressure, the valve also embodying means whereby, in case of dearrangement of the mechanism, the valve may still be used to perform the usual and ordinary function of an inflating valve.

With the above and other objects in view, the invention consists in the novel construction, combination and arrangement of parts, as herein described, illustrated and claimed.

In the accompanying drawings:—

Figure 1 is a side elevation of a valve embodying the present invention.

Fig. 2 is a vertical diametrical section through the same.

The casing of the valve which is designated generally at A comprises a relatively large inner end portion 1 of tubular formation forming a cylinder in which is mounted a piston valve 2, the remainder of the valve casing being reduced in diameter at 3 for a purpose which will presently appear, the reduction in the size of the casing forming an annular shoulder 4 which will limit the outward movement of the piston valve 2.

At its outer extremity the reduced portion 3 of the casing is threaded to receive an externally rabbeted ring 5 forming a seat for a cap 17. The piston valve 2 has a stem 6 formed with a central longitudinal bore 7 which extends through the piston valve 2 and through which bore air is introduced into the tire under pressure from a suitable tank, pump or air compressor of any description. Encircling the stem 6 is an adjustable bushing 9 threaded and adjustable in the outer end of the smaller portion 3 of the casing A. A tensioning or governing spring 10 is interposed between the piston 2 and bushing 9 and therefore exerts a pressure which tends to force the piston valve 2 inwardly causing the latter when the tire is under pressure to cover and close a lateral vent port 11 in the side of the cylinder 1. The piston 2 has a passage 8 intersecting an annular groove 8' to register with the port 11.

The piston valve 2 is provided with an air outlet passage 12 adapted to move into and out of line with an audible signal such as a whistle designated generally at B and comprising a tubular body 13 having the usual vent opening 14 and having threaded thereon a sleeve-like closure 15 by means of which, when necessary, the opening 14 may be closed to prevent further escape of air from the tire.

The stem 6 extends beyond the head 5 and is graduated as indicated at 16 so as to indicate the number of pounds pressure within the tire and against the piston valve 2, the graduations being exposed beyond the head 5 which therefore acts as a marker or indicator in conjunction with the graduations. An inclosing cap 17 mainly of transparent material such as glass, is removably fitted to the outer extremity of the valve casing, said cap preferably embodying a metallic rim 5 at the inner edge thereof which is internally threaded to engage the threaded end portion 3 of the valve casing A. The transparent cap 17 enables the graduations on the stem 6 to be read without removing said cap.

The outer end of the stem 6 is externally threaded to enable a compressed air connection to be detachably associated therewith and within the bore 7 of the stem 6 there is mounted the usual inflating valve 19.

In operation, to inflate a tire with which the valve of this invention is associated, the cap 17 is removed and the compressed air connection is attached to the extremity of the stem 6. The incoming air displaces the valve 19 and as the pressure increases in the tire, the piston valve 2 moves outwardly under such pressure. In the event of an excessive amount of compressed air being forced into the tire, the piston valve 2 moves outwardly until it uncovers the port or vent 11 so that thereafter the pressure in the tire may not be further increased. As the piston valve 2 moves outwardly, the graduations 16 on the stem 6 are exposed for visual inspection so that the attendant may cut off the supply of compressed air when the proper graduation is exposed. The compressed air connection is then detached from the stem 6 and the cap 17 is then placed upon the end of the valve casing. Should the pressure in the tire fall below a predetermined number of pounds per square inch, the piston valve 2 in moving inwardly will bring the discharge end of the passage 12 into registry with the receiving end of the whistle B thereby audibly notifying the driver of the machine that one of the tires needs inflation. The operator may temporarily prevent further escape of air through the passage and the opening 14 of the whistle by closing the opening 14 with the aid of the sleeve 15 until a point is reached where a supply of compressed air may be obtained. The spring 10 may be adjusted by means of the collar 9 to cause the device to operate under any given maximum pressure and should said spring break, the opening 14 of the whistle may be closed by the sleeve 15 and a plug 20 may be inserted in the port or vent 11 to prevent escape of air at that point. In this way, even after the breakage of the spring 10, the valve may be used in the same way as the ordinary inflating valve.

Having thus described my invention, I claim:—

In a valve of the class described, a cylinder, a piston head working therein and having a tubular piston rod the bore of which extends through the piston and piston rod and is open at both ends, an inflating valve within said bore of the piston rod, the cylinder being formed with high and low pressure vents in the side wall thereof located at different points in the length of the cylinder, and an audible signal communicating with one of said vents, said piston head being formed with radially extending high and low pressure passages intersecting said bore and respectively movable into and out of line with said high and low pressure vents in the cylinder.

In testimony whereof I affix my signature in presence of two witnesses.

LOUIS F. KERNDL.

Witnesses:
W. H. COLT,
Z. C. GOODELL.